Dec. 11, 1962        A. BEKEY        3,068,373
SYNCHRONOUS MOTORS OF THE HYSTERESIS TYPE
Filed June 22, 1959        3 Sheets-Sheet 1
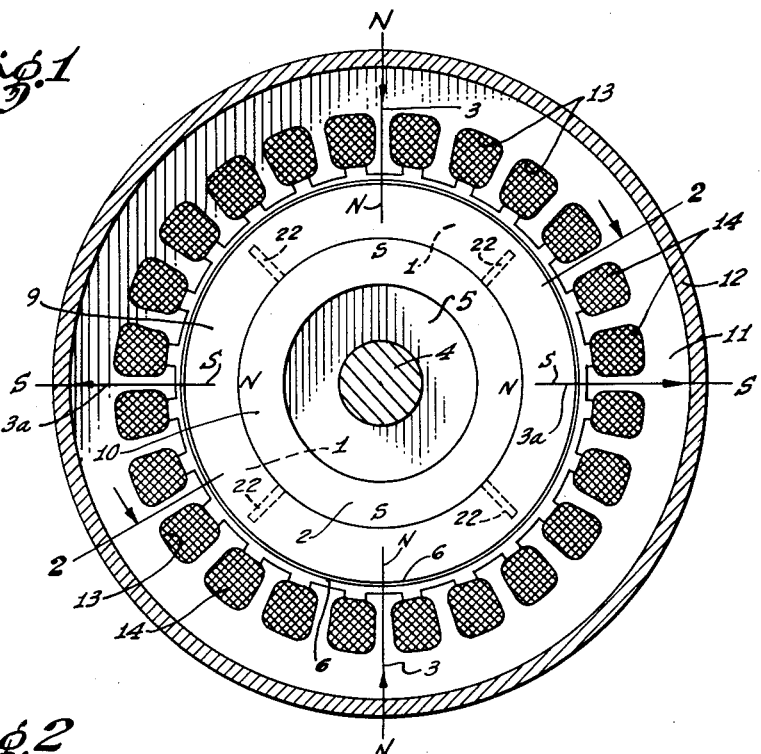
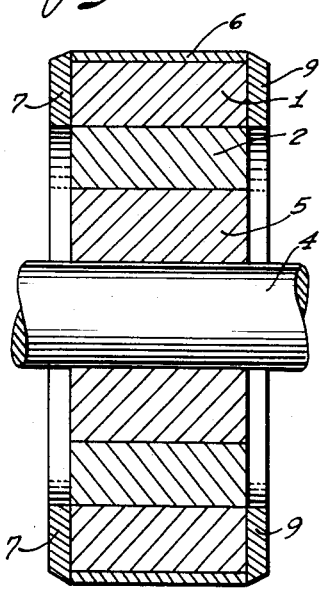
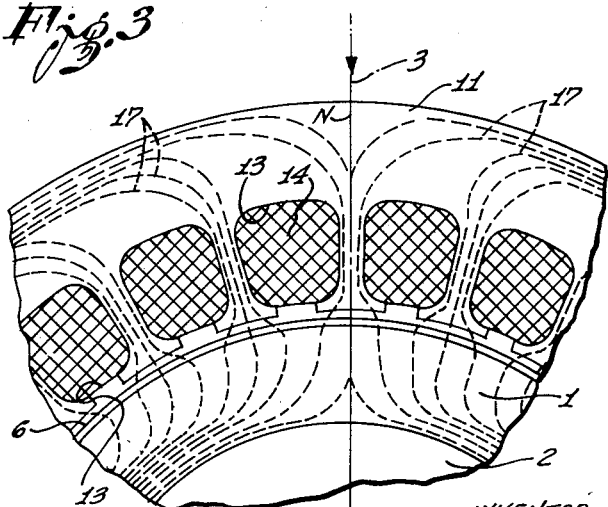
INVENTOR:
Andrew Bekey
By Smyth & Roston
Attorneys Dec. 11, 1962 A. BEKEY 3,068,373
SYNCHRONOUS MOTORS OF THE HYSTERESIS TYPE
Filed June 22, 1959 3 Sheets-Sheet 2

INVENTOR:
Andrew Bekey

Smyth & Roston
By
Attorneys

Dec. 11, 1962 A. BEKEY 3,068,373
SYNCHRONOUS MOTORS OF THE HYSTERESIS TYPE
Filed June 22, 1959 3 Sheets-Sheet 3

INVENTOR:
Andrew Bekey

By Smyth & Roston
Attorneys

United States Patent Office 3,068,373
Patented Dec. 11, 1962

3,068,373
SYNCHRONOUS MOTORS OF THE HYSTERESIS TYPE
Andrew Bekey, West Los Angeles, Calif., assignor to Genisco Incorporated, Los Angeles, Calif., a corporation of California
Filed June 22, 1959, Ser. No. 821,781
16 Claims. (Cl. 310—162)

The present invention relates to electric motors, and it relates more particularly to alternating current synchronous motors of the hysteresis type.

This application is a continuation-in-part of copending application Serial No. 716,779 which was filed February 21, 1958 (now abandoned).

The hysteresis alternating current synchronous motor is at present well known to the art. This motor usually includes a cylindrical rotor which is composed of magnetic material of relatively high coercivity, and it also includes a stator for producing a rotating magnetic flux. A torque is created on the rotor of the motor by hysteresis action, and the motor is self-starting. When the rotor of the motor is accelerated up to synchronous speed, it becomes magnetized in fixed directions under the control of the stator magnetic field.

If a magnetic field is rotated around a cylinder composed of magnetic material, the magnetic poles induced in the cylinder by the magnetic field react with the magnetic field to exert a torque on the cylinder. This torque is created only if an angle exists between the field and the respective axes of the magnetic poles produced in the cylinder. That is, the axis of each pair of poles produced in the cylinder must lag behind the corresponding polar positions of the stator exciting field. This lag, known as the hysteric lead angle ($\theta$), is produced by the hysteresis of the rotor. Therefore, the larger the hysteresis effect on the rotor, the greater the torque exerted on it.

It can be shown that the torque exerted on the rotor of a hysteresis motor can be expressed by the following equation:

$$T = \frac{P.V.W_h}{2\pi} \quad (1)$$

where:

T—torque in dyne-centimeters
P—number of poles
V—volume of rotor in cubic centimeters
$W_h$—area of hysteresis loop of the rotor It should be noted from the above equation that the torque exerted on the rotor of a hysteresis motor is independent of the frequency of the stator current and of the actual speed of the rotor.

At any rate of speed of the hysteresis motor between zero and synchronous speed, the value of the hysteric lead angle ($\theta$) remains constant, but the rotor poles induced in the rotor slip with respect to the rotor surface. When synchronous speed is reached, slipping ceases and the rotor poles are stationary with respect to the rotor surface.

The rotating stator magnetic field of the hysteresis motor may be produced, for example, from a three-phase or a two-phase supply source, or by the use of an appropriate phase-splitting device. The embodiment of the invention to be described will be of the type in which four radial polarities are produced in the rotating stator flux. These polarities are at right angles to one another. The stator flux induces two pairs of radial poles across the rotor, with the rotor poles being angularly displaced by 90° with respect to one another around the rotor surface and being alternately north and south poles. It will be understood, of course, that the invention is equally applicable to hysteresis motors having different numbers of poles.

Motors of the hysteresis type, as described above, are most often available in fractional horsepower sizes, although they are not limited to that range. There is a growing demand for the hysteresis motor in control fields, and in other applications where there is no appreciable power requirement. That is, the hysteresis motor finds wide utility in electronics, in a wide variety of controls, and in other low power applications, because of the simple mechanical construction and of the constant torque characteristics exhibited by this type of motor.

However, the prior art type of hysteresis motor suffers from several inherent limitations, and the principal object of the present invention is to eliminate these limitations and thereby to provide an improved construction for the hysteresis type of motor.

The torque capabilities of the prior art hysteresis motor is extremely low, and this can result in an objectionably long acceleration time for the prior art hysteresis motor from the time when the motor is first started to when it reaches synchronous speed. One of the important objects of the present invention is to provide an improved type of hysteresis motor in which its torque capabilities are increased as compared with the previous known types of hysteresis motors, so that the required starting time for the motor to reach synchronous speed is materially reduced.

Another drawback suffered by the hysteresis motors of the prior art is that these motors experience a further reduction in torque capabilities due to parasitic losses. These parasitic losses arise through pulsations in the rotating stator magnetic field in the annular air gap separating the rotor from the stator. These pulsations, in turn, are caused by the tooth and slot configuration of the inner surface of the motor. The succession of tooth and slot openings in the inner surface of the stator results in a cyclic remagnetization of the rotor in minor hysteresis loops. In accord with some prior art practices, these parasitic losses have been reduced by closing the stator slots. However, the closed slot construction leads to low power factors due to increased slot reactance. Also, the manufacturing cost of the closed slot construction is high because it is then usually necessary to make two stampings instead of one, and several bonding and grinding operations are typically required for the closed slot construction. Also, the closed slot configuration renders stator repair most difficult in the event of failure in the stator windings.

The improved construction of the embodiment of the present invention which will be described provides a hysteresis motor which is constructed so that parasitic losses are reduced to a minimum, and this is achieved with a usual open slot stator construction and without the need for closing the stator slots.

The pull-in torque of the prior art hysteresis motors is relatively low, as compared with other types of synchronous motors of comparable size. Also, the prior art hysteresis motor has a tendency to slip and hunt in the presence of variations in load. Most control applications, however, such as the drive of magnetic memory drums, tape drives, the drive of different types of timing devices, and the like, require a minimum of slippage or hunting in the motors driving these instrumentalities. However, with the prior art form of hysteresis motor, step loads have a tendency to cause the motor to hunt, and any load requiring an instantaneous torque higher than the pull-in torque causes the rotor to slip excessively. The improved motor of the present invention, with its increased torque characteristic, is also advantageous in that its rotor is less subject to excessive slippage in the presence of load changes, and the rotor is also less subject to excessive hunting effects.

Another disadvantage in the prior art type of hysteresis motor is the excessive size of such a motor, as compared with other types of electric motors required to drive a given load. For example, the prior art hysteresis motor required to provide a given torque is about twice the size of the induction motor required to provide the same torque. One of the reasons for the excessive size requirements of the prior art hysteresis motor is that the hysteresis motor is working only at the actual level of magnetization of its rotor, which level is produced and maintained by the magnetizing current circulating at that time in the stator winding. Because most magnetic materials which are suitable for the rotor have a relatively low permeability, a large magnetizing current is required. To reduce the copper loss caused by the relatively large magnetizing current, low winding resistance and large slots are required. These requirements tend to a need for relatively large frame sizes in the hysteresis motor, as compared with the sizes of other types of prior art motors of comparable load driving capabilities.

The improved hysteresis motor of the present invention is constructed to produce relatively high flux densities at its rotor without the need for excessively high magnetizing currents. This permits a reduction in frame size for the motor, as compared with the prior art hysteresis motor, so that a given output from the motor constructed in accordance with the present invention can be obtained when that motor has a size comparable with the size of the other types of motors which are capable of driving the same load.

The need for high magnetizing currents in the prior art type of hysteresis motor also results in a low power factor characteristic. Another beneficial result from the concept of the present invention, whereby the magnetizing currents can be extremely small, is that the power factor of a hysteresis motor constructed in accordance with the invention is materially improved as compared with the power factor characteristic of the prior art hysteresis motor.

As described above, a feature of the hysteresis motor is that it is self-starting. However, and as noted above, while the rotor is being accelerated up to synchronous speed, its induced rotor poles are slipping with respect to the surface of the rotor. There is no fixed angular position of the rotor of the prior art hysteresis motor at which the rotor is locked in with the rotating stator magnetic field for the synchronous drive of the rotor. This factor in the prior art hysteresis motor is a limitation in many control applications, as well as for parallel operation of the motors, and in certain other areas in which it is required that several motors fed from the same source should maintain a fixed rotor angular relationship when the motors are running at synchronous speed. Another important feature of the improved hysteresis motor of the present invention is that the rotor is constructed to lock in with the rotating magnetic field at a definite angular relationship of the rotor shaft with respect to that field.

The improved hysteresis motor of the present invention achieves the objects described above and exhibits the stated features by means of several structural modifications and changes. One of these is the provision, for example, of a thin layer of high permeability magnetic material disposed about the periphery of the rotor. This layer preferably exhibits circumferential discontinuities to prevent any magnetic shunting effects by the high permeability layer on the other components of the rotor. This high permeability layer is important in reducing the parasitic losses of the machine as it serves to diffuse and more evenly distribute the lines of magnetic flux entering the rotor from the stator, and it thereby reduces magnetic flux pulsations due to the tooth-slot configuration of the bore of the stator.

Another structural modification exhibited by the embodiment of the invention to be described is the provision of end rings on the rotor which cooperate with the other components of the rotor to provide a "squirrel cage" structure acting as an induction motor secondary. The squirrel cage structure responds to any flux change caused by a deviation of the rotor from synchronous speed. The resulting current flow through the squirrel cage structure due to such a deviation sets up opposing magnetic fields which create a torque that tends to pull the rotor back into synchronous speed. This squirrel cage construction assists in providing increased torque in the rotor of the hysteresis motor of the present invention as compared with the prior art hysteresis motors, which increased torque not only reduces the time required for the motor of the invention to come up to synchronous running speed after starting, but also increases the pull-in torque and reduces slippage and hunting in the motor.

Yet another structural modification in the embodiment of the invention to be described is the use of an inner member in the rotor which is composed of magnetic material. This magnetic material has high coercivity and it is magnetized to exhibit permanent magnetic characteristics. The permanent magnet member is magnetized in a radial manner to exhibit a number of magnetic poles at its outer surface, these poles corresponding in number and in angular disposition to the number of stator poles in the machine. This permanent magnet member provides improved rotor torque characteristics at synchronous speed, and this is achieved with an extremely small magnetizing current which has a power factor which may be unity or even leading. This feature reduces copper losses in the motor of the invention to a minimum.

The embodiment of the invention to be described, therefore, includes a rotor which is made up, for example, of a plurality of nested concentric components. These components include a permanent magnet member of high coercivity and of low permeability, an active rotor element or "hysteresis component" of medium coercivity and low permeability, and an outer layer of low coercivity and high permeability. In accordance with an aspect of the present invention, and to prevent these ring-shaped components from acting as magnetic shunts for one another, a slotted construction of the active rotor element is provided, as will be described. This slotted construction includes a plurality of radial slots in the hysteresis rotor component, these slots being positioned between the poles induced in the rotor when it is running at synchronous speed.

The present invention possesses many other advantages, and it has other objects which may be made more clearly apparent from a consideration of the several embodiments of the invention. For this purpose, there are shown several forms of the invention in the drawings accompanying and forming a part of the present specification. These forms will now be described in detail, as illustrating the general principles of the invention. It is to be understood, however, that the following detailed description is not to be taken in a limiting sense, since the scope of the invention is particularly defined by the claims.

In the drawings:

FIGURE 1 is a cross-sectional view of an alternating current synchronous motor of the hysteresis type incorporating the invention, this view illustrating the composition of the open slot stator windings of the motor, and also illustrating the various concentric nested concentric components which make up the rotor;

FIGURE 2 is a longitudinal sectional view of the rotor of the motor shown in FIGURE 1, taken substantially on the line 2—2 of FIGURE 1, this latter view illustrating in more detail the various concentric annular components of the rotor which are mounted on a drive shaft, this view also showing the composition of certain electrically conductive end rings which are attached to the rotor to form a part of the rotor assembly;

FIGURE 3 is a fragmentary enlarged view, similar to the view of FIGURE 1, and illustrating the manner in which the magnetic flux is produced by the stator coils, and the manner in which the flux is introduced to the rotor of the motor;

Figure 6:
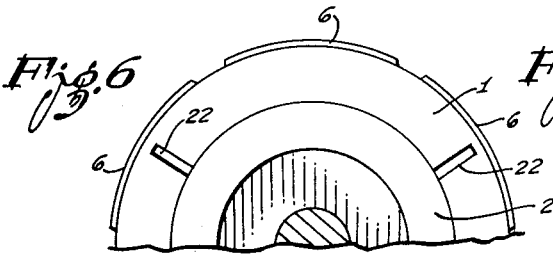
FIGURE 6 is a fragmentary side elevational view of a rotor element, similar to the view of FIGURE 1, and representing yet another embodiment of the invention.
Figure 6A:
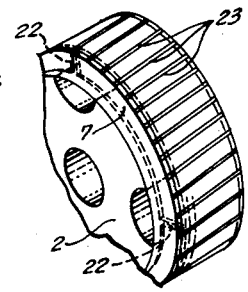

FIGURE 6A is a fragmentary perspective view of a rotor element similar to the rotor element of FIGURE 2, but which also includes axially extending copper bars extending between the end rings for reasons to be described; and FIGURES 7–10 are graphs illustrating the performance characteristics of a hysteresis motor embodying the invention and showing the comparison of that motor with a hysteresis motor of the prior art and of comparable size.

The embodiment of the invention illustrated in FIGURES 1–3 includes a rotor shaft 4 which is mounted for rotation in appropriate bearings, not shown. A hub 5 is mounted on the shaft 4, and this hub may have a cylindrical shape, as illustrated.

An annular magnetic member 2 of relatively high coercivity is coaxially mounted on the hub 5, and this annular member 2 is permanently magnetized in radial directions. The magnetization of the annular member 2 is such that a plurality of magnetic poles are produced at the periphery of the annular member 2. The number and angular disposition of these poles is determined by the number of stator poles. In the illustrated embodiment of FIGURE 1, for example, four such poles are produced at the periphery of the annular member 2. These magnetic poles are positioned at 90° intervals about the periphery of the annular member 2, and the poles alternate between north and south polarities about that periphery.

The permanent magnet annular member 2 may be composed, for example, of Alnico VI. This material exhibits high coercivity, and it also exhibits low permeability. The coercive force (Hc) of the annular member 2 may be, for example, of the order of 600 oersteds, and its permeability may be of the order of 17.

An active rotor element 1, which shall be termed the "hysteresis" member, is concentrically mounted on the permanent magnet member 2. The hysteresis member 1 is also of annular configuration. This latter member is composed of magnetic material exhibiting, for example, what may be termed "medium" coercivity as compared with the member 2, and exhibiting "medium" permeability as compared with that member. The annular hysteresis member 1, for example, may be composed of Simonds No. 81, 17 percent cobalt steel. This material has a coercive force (Hc) of 150 oersteds, and a permeability of 55. The hysteresis member 1 may be formed of one solid cast piece, or it may be built up of a stack of annular stampings.

The thin diffusion layer 6 of low coercivity and high permeability magnetic material is formed on the peripheral surface of the annular hysteresis member 1. This diffusion layer 6 may be formed, for example, of soft iron or mild steel. The annular members 1 and 2 are firmly mounted in concentric relationship with one another on the hub 5, and the hub 5 is firmly mounted on the shaft 4. Likewise, the diffusion layer 6 is firmly mounted on the periphery of the member 1. These elements, therefore, form a unitary rotor assembly.

A pair of squirrel cage end rings 7 and 9 are provided, and these rings may appropriately be composed of copper, or other material of high electrical conductivity. The end rings 7 and 9 are firmly bonded to the opposite ends of the hysteresis annular member 1. These rings, together with the other rotor elements 1, 2 and 6, provide a squirrel cage secondary winding for the hysteresis motor.

The stator of the hysteresis motor, as illustrated in FIGURES 1 and 3 may be of the illustrated annular configuration, and it may be formed of a plurality of ring-shaped laminations, such as the lamination 11 of FIGURE 1. These laminations are stacked on top of one another, and they are supported within a casing 12. The laminations may be composed, for example, of mild steel. The laminations provide open slots 13 in which one or more appropriate stator windings may be accommodated. The slots 13 are disposed radially and are at equi-angular positions. These slots have open ends extending into the bore of the stator.

As illustrated in FIGURE 1, the annular hysteresis member 1 may incorporate a plurality of peripheral slots 22 which are spaced in equi-angular relationship around its inner periphery. The slots 22, in the illustrated embodiment, are shown as being four in number and these slots are positioned at 90° intervals around the hysteresis member 1. The number of slots 22, however, will be dictated by the number of poles exhibited by the permanent magnet member 2, which poles (as mentioned) are equal in number to the number of stator poles in the motor. The radial slots 22 are located approximately midway between the successive ones of the poles around the periphery of the permanent magnet 2.

The slots 22 can be formed to extend in from the inner peripheral surface of the rotor, as shown, or they can be formed to extend in from the inner surface of the annular hysteresis member 1. When the latter construction is used, a bridge is left between each of the slots 22 and the peripheral surface of the member 1.

The slots 22 should be made as narrow as practicable. For example, these slots should have a width of between .010 inch and .032 inch. The remaining bridge between the slots 22 and the outer diameter of the annular hysteresis member 1 in the illustrated embodiment; or between the slots 22 and the inner diameter of the hysteresis member 1 in the alternate construction, is such that the magnetic density of the flux passing through the bridges formed by the slots 22 is well above saturation of the hysteresis member 1. That is, for example, the flux density is above 150,000 lines per square inch in the particular rotor under consideration.

The purpose of the slots 22 is to produce narrow regions in the annular hysteresis member 1 which are completely saturated, and which prevent that member from forming a magnetic shunt for the permanent magnet member 2. When a laminated rotor is used, the narrow regions may conveniently be formed by providing alternate rotor laminations in the form of full rings and segmented. The slots in the segmented laminations extend across the entire radial length of those laminations. Such a construction will be described in conjunction with FIGURE 6A.

The purpose of the inter-polar slots 22, as noted, is to introduce a partial or complete air gap between the poles of the permanent magnetic member 2 so as to increase the reluctance of the hysteresis member 1 in a circumferential direction.

Then, when the motor is first started, the rotating flux generated by the stator passes through the annular air gap between the stator and rotor and extends along circumferential paths in the hysteresis member 1 from pole to pole. The radial slots 22 in the rotor are equivalent to short air gaps in series with the main air gap. Because of the high stator magnetomotive force, the bridges formed in the hysteresis member 1 by the slots 22 will saturate and part of the flux will pass through the gap formed by the radial slots. During this accelerating period the motor will draw increased magnetizing current. The permeance of the circumferential paths for the stator flux through the slots 22 is designed to be such that the stator flux does not have a tendency to flow into the permanent magnet member 2 and therefore does not tend to demagnetize the permanent magnet member 2.

The torque produced during a synchronous operation of the motor can be traced to three different causes. The first is hysteresis torque due to remagnetization as the rotor is slipping with respect to the stator field. The second is eddy current torque in the rotor material. The third is induction motor torque produced by the squirrel cage winding on the rotor. This winding, as noted above, can use the solid hysteresis material of the member 1, as noted above. In FIGURE 6A, however, the outer surface of the hysteresis member 1 is provided with a plurality of axial slots which are located at successive angular positions about the rotor. A corresponding plurality of bars 23 are positioned in respective ones of the slots and are connected at their opposite ends to the rings 7 and 9. These bars may be formed of a material of high electrical conductivity, such as copper.

The resulting squirrel cage winding on the rotor of FIGURE 6A is useful in that it improves the pull-in torque characteristics of the motor. These bars 23 are especially helpful in the larger motors with relatively large rotor lengths.

As the rotor accelerates up to synchronous speed under the influence of the three torque components described above, the relative values of these torque components change as the rotor slip changes. As synchronous speed is approached, the torques due to eddy currents and squirrel cage winding induced secondary currents diminish to insignificant values. However, the hysteresis torque continues to accelerate the rotor until synchronous speed is reached.

The motor of the present invention, however, does not pull-in to synchronous speed in the same manner as a usual prior art hysteresis motor. The motor of the present invention behaves more like a direct current excited synchronous motor because of the presence of the permanent magnet member 2.

The rotor of the motor of the present invention assumes an angular alignment with respect to the stator field in a position such that the poles of the permanent magnet are radially aligned with opposite polarities in the stator field. In this position of the rotor, the magnetomotive force of the stator field and that of the permanent magnet member are additive. The stator flux now tends to pass down through the permanent magnet member instead of passing circumferentially. The motor now begins to draw reduced magnetizing current. If the magnetomotive force of the permanent magnet member 2 is large enough, the motor may draw a magnetizing current of unity or leading power factor.

Figure 4:
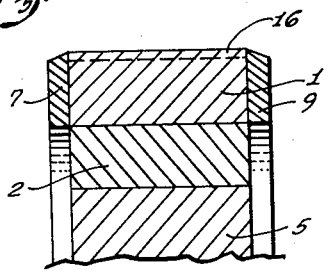
FIGURES 4 and 5 are sectional views in fragmentary form of hysteresis rotors incorporating the concepts of the invention, similar to the view of FIGURE 2, these latter views showing certain modifications in the form of the invention.

The diffusion layer 6 may have a thickness, for example, of .010–.030 inch depending on the diameter of the rotor and on the number of stator poles in the machine. This diffusion layer may be formed, for example, of soft iron powder, bonded with a resin; or it may be formed of soft iron, or mild steel, deposited electrolytically or applied by metal spraying processes. The diffusion layer of the high permeability material may be formed as a continuous layer about the annular hysteresis member 1, as indicated in FIGURES 1 and 2. Conversely, the diffusion layer may be formed by annealing a thin outside layer 16 (FIGURE 4) of the hysteresis annular member 1. This annealing can be carried out by high frequency induction heating, with exact control of the penetration being obtained by means of frequency regulation of the heating current. When a slotted configuration of the hysteresis annular member 1 is used, as illustrated in FIGURE 1, the resulting diffusion layer 6, or annealed diffusion layer 16, may exhibit circumferential discontinuities, this being desired to prevent magnetic shunting effects by the diffusion layers on the hysteresis member 1.

Figure 5:
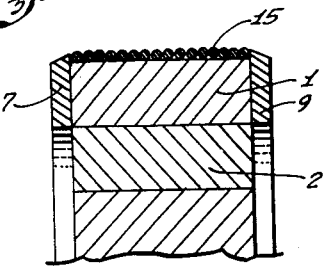

The diffusion layer of high permeability material may also consist of soft iron wires 15, for example, wound about the periphery of the annular hysteresis member 1 (FIGURE 5). Alternately, the diffusion layer 6 may exhibit further circumferential discontinuities for reducing its magnetic shunting effects, as shown in FIGURE 6.

In any event, the diffusion layer is usually not homogeneous, but it may consist of irregular grains and irregular circumferential regions. Accordingly, this layer of high permeability permits the flux lines entering the rotor from the teeth of the stator through the annular air gap to even out in a short length. The diffusion layer, therefore, effectively wipes out the slot pattern of the stator and its parasitic loss effect. The diffusion layer, therefore, helps to reduce parasitic losses in the motor. These losses, as mentioned above, are due to pulsations in the stator flux as it crosses the annular air gap between the stator and the rotor. These pulsations, in turn, are caused by the open slot configuration of the stator; this configuration being preferred for the reasons described above.

The high permeability diffusion layers described above provide a radial path long enough to diffuse the flux pattern caused by the slots 13, as explained. Also, by filling most of the annular space between the stator and rotor with a high permeability material, the effective width or radial length of the annular air gap is reduced to a minimum mechanical clearance, and the magnetizing currents required to supply the required magnetomotive forces are reduced as compared with the prior art hysteresis motors.

FIGURE 3 which shows a flux pattern in the stator 11 and the shape of the flux lines in the diffusion layer 6 and in the annular hysteresis member 1, indicates for clarity the diffusion layer 6 has having a depth several times larger than the proportions of the other elements. This is to illustrate the effect of mutual repulsion between the flux lines in the diffusion layer, resulting in a more uniform flux density at the surface of the annular hysteresis member 1. It will be observed that the lines of magnetic flux 17 are concentrated in the teeth of the rotor, and if it were not for the diffusion layer 6, the voids due to the open stator slots 13 would produce flux pulsations in the rotor. These pulsations, as mentioned above, would lead to parasitic losses. The arrow 3 in FIGURE 3 marks the center of one of the poles formed at a particular instant by the rotating magnetic flux of the stator. It will be appreciated that in a four pole machine, a second polarity would also form at 90° to the polarity represented at 3, this second polarity being represented by the arrow 3a in FIGURE 1.

The squirrel cage end rings 7 and 9 described above, and which are joined to the hysteresis rotor component 1, cause the rotor to exhibit a squirrel cage structure. The entire rotor structure, including the annular hysteresis member 1 in the embodiments of FIGURES 1–6, and including the bars 23 in the embodiment of FIGURE 6A, carries the secondary currents in an axial direction, and the over-all electrical resistance presented to these currents in the axial direction is relatively low because of the relatively high cross-sectional area of these rotor components. The result of these rotor components, together with the end rings 7 and 9 provides an effective squirrel cage induction winding. The result is that any deviation of the rotor of the hysteresis motor from synchronous speed (for shifts in loading) causes rotor currents to be induced in the squirrel cage winding. These rotor induction currents produce a flux which, in turn, produces a substantial synchronizing torque which tends quickly to bring or return the rotor to synchronous speed.

Certain difficulties are encountered when it is attempted to bond the end rings 7 and 9 to their corresponding annular rotor components, namely to the ends of the annular hysteresis member 1 and to the ends of the annular permanent magnet member 2. Soldering with a soft solder is not reliable because it is mechanically and thermally unstable. Hard solder or welding cannot be applied without annealing the magnetic material of which, for example, the hysteresis member 1 is composed. Such annealing, as indicated above, changes the structural composition of the magnetic material and provides high permeability characteristics with low coercivity.

There are several satisfactory methods, however, for applying the end rings 7—10. One of these methods consists of building up the end rings by electroplating; and another consists of forming the end rings by metallizing or metal spraying while the rotor is kept cooled. In both methods, the contact between the magnetic material forming the annular members 1 and 2 and the electrically conductive material forming the end rings 7—10 is extremely good, as is the electrical conductivity of the deposited or sprayed material.

It has been found that with the construction illustrated in FIGURES 1—3, that the stall torque of the motor can be increased by a factor of 3, and the acceleration time from starting to synchronous speed can be substantially reduced. If the clearance of the annular air gap between the rotor and the stator is sufficiently wide, a thin copper layer may be formed on the outer peripheral surface of the rotor to help reduce the resistance of the squirrel cage in the axial direction. However, such a copper layer is not a necessity.

It will be realized that the use of the squirrel cage construction described above has other beneficial effects apart from decreasing the acceleration time of the motor from starting to synchronous speed. This squirrel cage structure also, as indicated above, helps to hold the motor at synchronous speed, and opposes any tendency for the rotor of the motor to be pulled out of its synchronous speed. This squirrel cage winding also helps to prevent oscillations or hunting of the rotor at synchronous speed. As described above, the squirrel cage winding acts as an induction rotor winding in which any change of flux linkage caused a deviation of the rotor from synchronous speed, will produce induced rotor currents in the squirrel cage winding. These induced rotor currents, in turn, produce a torque which tends to restore the original synchronous speed of the motor.

It is a known fact that the performance of the prior art hysteresis motor at synchronous speed is inferior to that of a synchronous motor having a separately excited motor. This is because the rotor of the hysteresis motor has no separate excitation, and all its magnetomotive force must be produced by the rotating stator flux. The synchronous machine with the separately excited rotor, on the other hand, includes a rotor winding which provides the desired magnetization of the rotor from an external direct current source. This means that no exciting current for the rotor need be drawn by the stator of the separately excited type of synchronous motor. Therefore, the synchronous motor with the separately excited rotor can be operated at a power factor equal or approaching unity, and the out-of-phase stator currents and copper losses in that motor can be reduced to a minimum.

The hysteresis motor, even of the prior art type, however, possesses certain advantages over the synchronous motor with the separately excited rotor. The hysteresis motor, for example, does not require commutator brushes or slip rings, nor does it require any rotor winding or a source of rotor excitation.

The hysteresis motor of the present invention retains all the advantages of the prior art hysteresis motor listed above, and it also incorporates into the hysteresis type of motor the performance advantages of the synchronous motor with the separately excited rotor. This is achieved by the inclusion of the permanent magnet member 2 in the rotor assembly of the hysteresis motor illustrated in FIGURES 1-3, 4, 5 and 6.

Several factors must be considered, however, in the construction of the improved rotor of the present invention which, as described above, includes the concentrically arranged annular hysteresis member 1 and the inner permanent magnet member 2. One of these factors is that the permanent magnet member 2 must be composed of material of high coercivity. The coercivity of the permanent magnet member 2 must, for example, be higher than the coercivity of the annular hysteresis member 1. Unless the permanent magnet member 2 is composed of magnetic material of extremely high coercivity, its magnetism will be altered and changed by the rotating stator field when the rotor is slipping with respect to that field. This is an undesired condition, for that would destroy the capability of the permanent magnet member 2 from performing its intended function.

The intended function of the permanent magnet member 2 is to provide an additional flux which reacts with the rotating stator flux to provide an additional magnetomotive force. This additional magnetomotive force, without the need for any exciting current in the stator winding for its creation, assists in holding the rotor at synchronous speed. By use of the fixed magnetic field from the permanent magnet member, the rotor is held at synchronous speed at a predetermined angular relationship between the rotor shaft 4 and the rotating stator flux. This, as mentioned above, is important for many applications of the motor.

It is also important that both the annular hysteresis member 1 and the annular permanent magnet member 2 exhibit a low permeability. If, for example, the hysteresis member 1 exhibited a high permeability, it would serve as a magnetic shunt for the permanent magnet member and destroy its effects. This shunting effect of the hysteresis member 1 on the permanent magnet member 2 is successfully reduced to a minimum by the fact that the permeability of the hysteresis member is relatively low, and also by the formation of the slots 22. These slots, as mentioned above, create restricted and easily saturated bridges in the hysteresis member. Moreover, the radial slots 22 are angularly disposed between the magnetic poles produced by the permanent magnet member 2 at its periphery, so that the flux from the permanent magnet member is caused to move through the hysteresis member 1 and through the annular air gap of the motor to the stator 11. This permits the permanent magnet member 2 properly to perform its intended function.

It is also important, of course, that the permeability of the permanent magnet member 2 be sufficiently low that it will not shunt the hysteresis member 1. Such magnetic shunting of the hysteresis member would impair its capability of creating a hysteresis torque in the motor. The choice of materials for the hystersis member 1 and for the permanent magnet member 2, as indicated above, is such that both these members exhibit a relatively low permeability, with the permeability of the permanent magnet member being actually lower than that of the material in the hysteresis member. Moreover, the materials in these two members are chosen, as indicated above, so that the permanent magnet member exhibits a relatively "high" coercivity, whereas the hysteresis member exhibits a "medium" coercivity.

The diffusion layer 6 also preferably discontinues in a circumferential sense, as described above, so that it will not serve as a magnetic shunt for the flux from the permanent magnet member, or for the flux from the stator windings. Also, the slots 22 can be extended through this layer to achieve such discontinuities.

The cross section of the annular hysteresis member 1 should be considerably smaller than is usually required for the optimum $B/H$ product. This is because the flux density is reduced by leakage in the permanent magnetic material of that member and because at synchronous speed the hysteresis rotor operates at reduced density as most of the flux passes radially through the permanent magnet member 2. Moreover, the size of the permanent magnet member 2 should be such that the useful flux produced by that member, that is the part of the flux passing through the annular air gap of the motor, should be about one-half of the total operating flux of the motor at synchronous speed. With a weak annular permanent magnet member 2, the improvement due to that member is not noticeable. However, if the annular permanent magnet member is too strong, the motor will not reach synchronous speed.

In the rotor assembly of FIGURE 6A the permanent magnet member 2 is shown as having a saliency configuration to conserve material and reduce the rotor weight. Also, and as described above, the rotor of FIGURE 6A includes the bars 23 which are connected to the end rings 7 and 9 and which form a squirrel cage, induction motor, winding.

The bars 23 also serve to hold the hysteresis member 1 together when it is formed of laminated material. As noted, the slots 22 may be formed in every second lamination in the hysteresis member 1 of the rotor in FIGURE 6A. The slots 22 may then be formed completely through the radial width of the alternate laminations. Such a technique for forming the restricted bridges in the hysteresis member 2 has proven to be relatively simple to carry out during the fabrication of the rotor.

A large number of different hysteresis motors, ranging from 1/100 to 3/4 horsepower running at speeds from 60 r.p.m. to 12,000 r.p.m., have been built by applying one or more of the components of the invention with slight variations. Suitable tests have been conducted on these motors. The following motor is typical of the many that have been built, and it shall be used to demonstrate the improvements achieved by following the teaching of the invention.

The constructed motor was designed to operate on 400 cycles, 115 volts, single phase, six pole, 8000 r.p.m. The tests described were conducted on a balanced two-phase supply, because a capacitor phase split is correct only at one load and speed. Two complete rotors with shafts for this motor were built. One of the rotors was a usual prior art 17 percent cobalt steel hysteresis rotor, and the other rotor incorporated all three annular members 1, 2 and 6 of the rotor shown in FIGURE 2. The motor has the following data:

*Stator Common to Both Rotors*

| | Inches |
|---|---|
| Outside diameter | 4.375 |
| Separating or inside diameter | 3.180 |
| Axial length of core | .500 |
| Radial length of gap | .010 |

Seventy-two slots were used for the stator, wound with a sinusoidal concentric six-pole, two-phase winding. Both phases were wound with ninety-seven turns #24 heavy Formvar. The number of turns beginning with the smallest coil, spanning three teeth is 10, 16, 21, 24, 26. The resistance measured cold is 6.6 ohms per phase.

*Hysteresis Rotor*

| | Inches |
|---|---|
| Axial length | .500 |
| Radial depth | .200 |

Material Simonds #81.

*Rotor of Invention*

| | Inches |
|---|---|
| Diffusion layer depth | .015 |
| Diffusion layer length | .500 |
| Hysteresis rotor depth | .185 |
| Hysteresis rotor length | .500 |
| Permanent magnet rotor depth | .250 |
| Permanent magnet rotor length | .500 |
| Axial extension of end ring | .125 |

Hysteresis rotor of Simonds #81, 17% cobalt steel.
Permanent magnet rotor Simonds Alnico VI.
Diffusion layer of Armco iron metal sprayed.
End ring deposited by electroplating.

All parts were machined or ground to close tolerances and bonded with epoxy resin.

The applicant first made a test on rated 115 volts with the simple hysteresis motor. Readings were taken over the whole operating range from standstill to pull-out at intervals of 8 oz. inches torque. The following data were noted: voltage, frequency, current, input watts, torque and r.p.m. Output, losses, efficiency and power factor were calculated from these notations.

Figure 7:
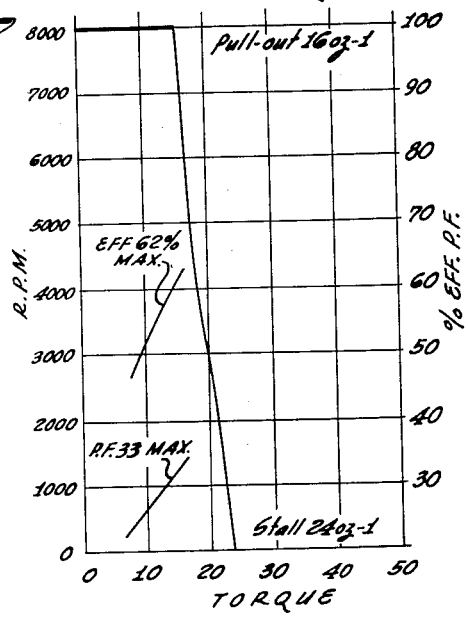

FIGURE 7 shows the characteristics as curves fitted on data.

Figure 8:
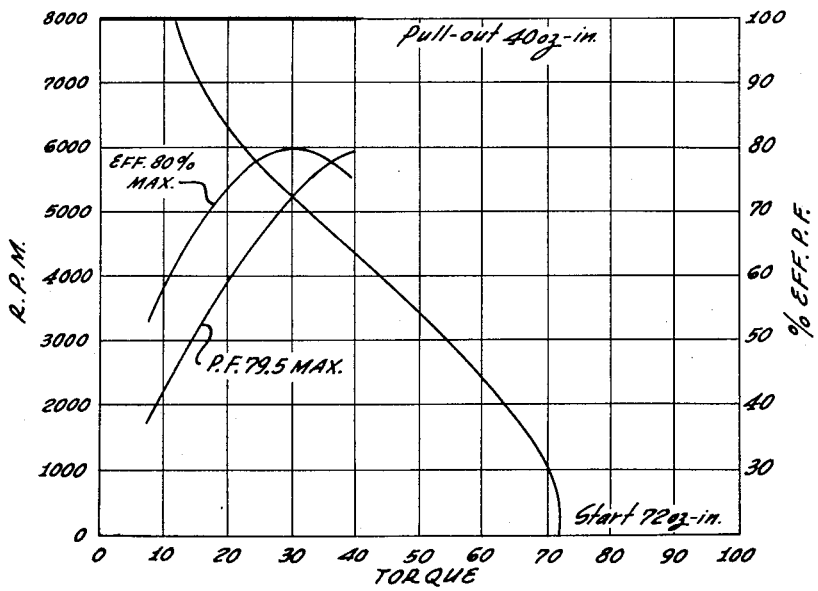

Next the applicant exchanged the hysteresis rotor against the composite one of the invention and repeated the same tests. The results were much superior to those shown in FIGURE 7. They are shown in the graphs of FIGURE 8.

Figure 9:
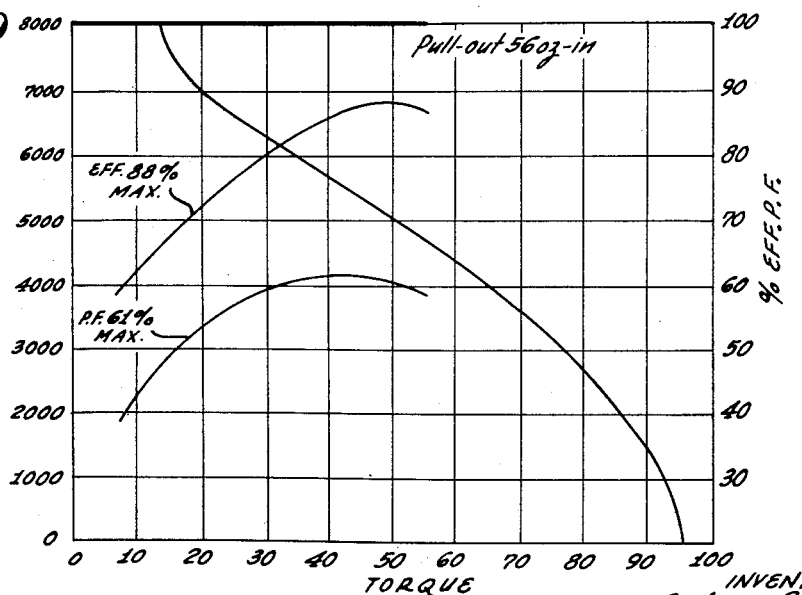

Then the applicant raised the line voltage for the motor of his invention to 150 volts and checked out all data again. These are shown in FIGURE 9.

Figure 10:
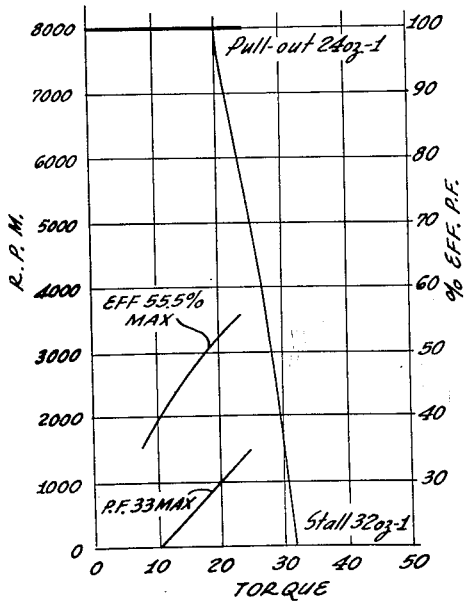

As a last test, the applicant installed the original simple hysteresis rotor and repeated the tests on 150 volts. The data shown in FIGURE 10 showed markedly poorer results.

Below are shown in table form some of the numerical values of these tests, using the same stator; the left-hand columns corresponding to the standard hysteresis rotor-type motor, and the right-hand columns corresponding to the motor employing a rotor corresponding to this invention.

TABLE I

| Rotor used | Line voltage 115 V. | |
|---|---|---|
| | Hysteresis | Invention |
| Stall torque oz. in. | 24 | 72 |
| Pull-in torque oz. in. | 15 | 12 |
| Pull-out torque oz. in. | 16 | 40 |
| Input watts at max. torque | 152 | 320 |
| Shaft output watts | 96 | 240 |
| Total losses, watts | 56 | 80 |
| Efficiency percent | 62.5 | 75 |
| Power factor | .33 | .795 |
| Apparent efficiency PF × eff. percent | 20.6 | 59.6 |

TABLE II

| Rotor used | Line voltage, 150 v. | |
|---|---|---|
| | Hysteresis | Invention |
| Stall torque oz. in. | 32 | 96 |
| Pull-in torque oz. in. | 20 | 16 |
| Pull-out torque oz. in. | 24 | 56 |
| Input watts at max. torque | 260 | 380 |
| Shaft output watts | 144 | 336 |
| Total losses, watts | 116 | 44 |
| Efficiency percent | 55.5 | 88 |
| Power factor | .33 | .60 |
| Apparent efficiency PF × eff. percent | 18.4 | 53 |

The above figures show clearly the superiority of the new rotor, especially at a higher magnetic density, where the losses, characteristic to the hysteresis motor, amount to 116 watts which is excessively high, and has to lead to destruction at the given small physical size. On the other hand, the new motor on this voltage has only 44 watt losses at more than twice larger output of almost one-half horsepower. It is important to point out that the motor is capable of delivering this output at a continuous rate, because of the extraordinary high efficiency of 88%, resulting in relatively low losses, which are within the thermal capacity of this size motor, if fan cooled.

While the above data are proof of the advantages of this invention, they are only average. Based on the experimental work, it can be stated that higher efficiencies, output and power factor are possible. For those with experience in design, it is desired to point out that the air gap in this motor can be reduced to a mechanical clearance of .004, that the large number of slots is not necessary, that the ohmic resistance of the winding may be high for the increased output, and that the radial depth of the hysteresis member for best results should correspond to a nominal density of 100,000 lines per square inch.

The applicant built a completely new motor according to these changes with an outside diameter of 4.75 inches and the same gap diameter. It had an efficiency of 90% and a power factor of .70.

This applicant has described in detail the structural, electric and magnetic properties, and characteristics of the invention and has shown data and curves taken from actual tests. While one machine of specific dimensions in the test has been referred to, it is understood that there is a wide field of variations possible, by using materials of somewhat different composition and the results will ultimately depend on the skill of the designer in using correct proportions, according to known principles applied to the design of magnetic circuits and electric motors.

The description has referred only to motors, but are applicable to clutches and alternators, as well.

Each of the three components described constitutes an improvement when applied individually, but the main object of the invention is a new self-starting synchronous motor using a new composite rotor.

This new motor has the best features of other known motors, without their inherent disadvantages.

The invention provides, therefore, an improved alternating current synchronous motor of the hysteresis type. In accordance with the concepts of the present invention, an alternating current motor is provided which has all the advantages normally exhibited by hysteresis motors over the other types, and which also incorporates the advantages of the other types of motors into the hysteresis motor. The motor of the present invention, for example, exhibits high pull-in torque capabilities and low starting times comparable with the separately excited type of synchronous motor. The motor of the invention also has good power factor characteristics, and it also has the capability of rotor lock-in with the rotating stator flux at a predetermined angular relationship between the two.

I claim:

1. In alternating current apparatus of the hysteresis type: a stator structure having a first surface and at least one stator winding; and a motive structure disposed in contiguous relationship to the stator and including a hysteresis member formed of magnetic material of a particular coercivity and having a saturating bridge formed therein of restricted cross-sectional area, and a member positioned on the periphery of the rotor and formed of magnetic material of relatively high permeability and relatively low coercivity as compared with the magnetic material forming the hysteresis member.

2. In alternating current apparatus of the hysteresis type: a stator structure having an internal surface and constructed to support at least one stator winding; and a rotor structure supported within the stator and including a hysteresis member formed of magnetic material of a particular coercivity, and further including a magnet member positioned within the hysteresis member and formed of magnetic material of a relatively high coercivity with respect to the coercivity of the magnetic material forming the hysteresis member and constructed to obtain a passage of magnetic flux through the hysteresis member, said magnet member producing a plurality of magnetic poles at spaced angular positions, and said hysteresis member having a plurality of air gaps therein at angular positions intermediate the angular positions of said magnetic poles to form localized saturating bridges at such angular positions.

3. In combination for use in alternating current apparatus of the hysteresis type, a rotor structure including: a hysteresis member formed of magnetic material of a particular coercivity and having at least one portion thereof formed as a saturating bridge of restricted cross-sectional area, and at least one magnetic diffusion layer positioned on the periphery of the hysteresis member and formed of magnetic material of relatively high permeability and relatively low coercivity as compared with the magnetic material forming the hysteresis member.

4. A rotor for alternating current apparatus of the hysteresis type including: a hysteresis member formed of magnetic material of a particular coercivity, a magnet member positioned within the hysteresis member and formed of magnetic material of relatively high coercivity with respect to the coercivity of the material forming the hysteresis member and constructed to produce a flow of magnetic flux through the hysteresis member, said magnet member producing a plurality of magnetic poles at spaced angular positions, and said hysteresis member having a plurality of restricted portions therein at angular positions intermediate the angular positions of said magnetic poles to form saturating bridges at such angular positions.

5. In alternating current apparatus of the hysteresis type, a stator, means in the stator for producing a flux having progressive displacements in position at a particular speed, motive means disposed in magnetically coupled relationship to the stator to receive the flux from the stator for a movement of the motive means in accordance with the progressive displacements in the flux from the stator, means including a first member disposed on the motive means and provided with characteristics to obtain a passage of flux between the motive means and the stator at the particular speed of the motor for locking the motive member at the particular speed, means including a second member disposed on the motive means in magnetically coupled relationship with the first member and the stator for facilitating the passage of the locking flux between the motive means and the stator at rotor speeds near the particular speed and for inhibiting the passage of the locking flux from the stator to the first member at rotor speeds removed from the particular speed, and means included in the motive means responsive to the flux from the stator at speeds of the motive means removed from the particular speed for facilitating a rate of change of the speed of the motive means to obtain the particular speed.

6. In alternating current aparatus of the hysteresis type wherein a stator is included and wherein means are included in the stator for producing flux having displacements at a particular speed: a motive means, including, means including a first member constructed to produce a flux upon a movement of the motive means at the particular speed for locking the movements of the motive means at the particular speed, means including a second member disposed between the first member and the stator for bypassing the flux from the stator from passage to the first member at speeds of the motive means different from the particular speed, and means included in the motive means responsive to the flux from the stator at speeds of the motive means removed from the particular speed for facilitating a rate of change of the speed of the motive means to obtain the particular speed.

7. In a hysteresis motor: a stator structure having open stator slots; and a rotor structure having a hysteresis member, and an interrupted layer on the periphery of the rotor with the interruptions in the layer positioned to prevent magnetic shunting in the motor through the layer, the layer formed of high permeability, low coercivity magnetic material; the resultant air gap between the rotor and stator structures being no greater than that required for mechanical clearance.

8. In a rotor structure for a hysteresis motor: a magnetic member of ring form having medium coercivity; a circumferentially interrupted layer on the outer periphery of the ring, and formed of high permeability, low coercivity magnetic material; and low resistance end rings joined to the end surfaces of the magnetic member, and in good electrical contact with the magnetic member; said end rings and magnetic member defining a rotor serving as a secondary short-circuited winding of an induction motor.

9. In a rotor structure for a hysteresis motor: a magnetic hysteresis member having a cylindrical periphery and end surfaces; a circumferentially interrupted layer on the cylindrical periphery of the hysteresis member, and formed of high permeability, low coercivity magnetic material; and conducting members electrically joined to the end surfaces for forming with the hysteresis member, an amortisseur winding.

10. In a rotor structure for a hysteresis motor: a ring-like hysteresis member of medium permeability; and a permanent magnet within the member having radial poles, the magnet being made from material having substantially lower permeability than the hysteresis member.

11. In a rotor structure for a hysteresis motor: an outer hysteresis ring of hardened magnet steel and having medium coercivity and medium permeability; and an inner member of premagnetized, high coercivity and low permeability magnet steel; and high conductivity, non-magnetic end rings in intimate electrical contact at least with the hysteresis member.

12. A self-starting synchronous motor having a permanent magnet element for providing the excitation for the motor, and other elements including a hysteresis member of medium permeability serving as a secondary flux path for an induction motor rotor secondary.

13. A rotor for a self-starting synchronous motor, including: a hysteresis member of medium permeability; a permanent magnet; and means forming with the member, an induction motor secondary to serve for acceleration and an amortisseur winding.

14. A rotor for a self-starting synchronous motor, including: a permanent magnet; and a hysteresis member of medium permeability for accelerating the rotor from standstill, said hysteresis member being so arranged with respect to the magnet that it operates at very high magnetic densities at starting and slip speeds, and at reduced densities in synchronism.

15. A rotor for a self-starating synchronous motor having a rotary hysteresis member; and an interrupted band of high permeability material extending around the hysteresis member with the interruptions in the band of material positioned to prevent magnetic shunting in the motor through the band of material.

16. A rotor for a self-starting synchronous motor having a rotary hysteresis member; an interrupted band of high permeability material extending around the hysteresis member; and a permanent magnet within the hysteresis member.

References Cited in the file of this patent

UNITED STATES PATENTS

| | | |
|---|---|---|
| 1,761,836 | MacFarland et al. | June 3, 1930 |
| 1,912,075 | Hansen | May 30, 1933 |
| 2,183,404 | Morrill | Dec. 12, 1939 |
| 2,328,743 | Roters | Sept. 7, 1943 |
| 2,525,455 | Merrill | Oct. 10, 1950 |
| 2,823,327 | Kolhagen | Feb. 11, 1958 |

FOREIGN PATENTS

| | | |
|---|---|---|
| 234,191 | Great Britain | May 26, 1935 |
| 631,299 | Great Britain | Oct. 31, 1949 |
| 711,777 | Great Britain | July 14, 1954 |